United States Patent
Tang et al.

(10) Patent No.: US 9,082,433 B1
(45) Date of Patent: Jul. 14, 2015

(54) PMR WRITER WITH PATTERNED SHIELDS FOR ADJACENT TRACK ERASURE IMPROVEMENT

(71) Applicant: Headway Technologies, Inc., Milpitas, CA (US)

(72) Inventors: Yuhui Tang, Milpitas, CA (US); Suping Song, Fremont, CA (US); Lijie Guan, Cupertino, CA (US); Moris Dovek, San Jose, CA (US); Yaguang Wei, Pleasanton, CA (US); Yue Liu, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 14/297,839

(22) Filed: Jun. 6, 2014

(51) Int. Cl.
*G11B 5/127* (2006.01)
*G11B 5/31* (2006.01)

(52) U.S. Cl.
CPC .............. *G11B 5/315* (2013.01); *G11B 5/1278* (2013.01)

(58) Field of Classification Search
CPC .... G11B 5/1278; G11B 5/3116; G11B 5/315; G11B 5/3146; G11B 5/11
USPC ...................................... 360/125.3, 128, 319
See application file for complete search history.

(56) References Cited

U.S. PATENT DOCUMENTS

| 8,035,930 B2 | 10/2011 | Takano et al. |
|---|---|---|
| 8,274,764 B2 | 9/2012 | Hara et al. |
| 8,369,048 B2 | 2/2013 | Miyauchi et al. |
| 8,498,079 B1 | 7/2013 | Song et al. |
| 8,630,068 B1 * | 1/2014 | Mauri et al. ................... 360/319 |
| 2009/0166184 A1 | 7/2009 | Zhou et al. |
| 2011/0273798 A1* | 11/2011 | Wu et al. ................... 360/123.12 |
| 2012/0140356 A1* | 6/2012 | Horide ............................ 360/75 |
| 2014/0160596 A1* | 6/2014 | Sapozhnikov et al. .. 360/125.12 |
| 2014/0268405 A1* | 9/2014 | Machita et al. .................. 360/75 |
| 2014/0293474 A1* | 10/2014 | Yamane et al. ................. 360/75 |

OTHER PUBLICATIONS

"Micromagnetic Analysis of Adjacent Track Erasure of Wrapped-Around Shielded PMR Writers," by Suping Song, et al., IEEE Transactions on Magnetics, vol. 45, No. 10, Oct. 2009, pp. 3730-3732.
"Characterization of Adjacent Track Erasure in Perpendicular Recording by a Stationary Footprint Technique," by Yuhui Tang, et al., IEEE Transactions on Magnetics, vol. 49, No. 2, Feb. 2013, pp. 744-750.

* cited by examiner

*Primary Examiner* — Will J Klimowicz
(74) *Attorney, Agent, or Firm* — Saile Ackerman LLC; Stephen B. Ackerman (57) ABSTRACT

A PMR writer is disclosed wherein one or more of the leading shield, side shields, and trailing shield are comprised of first portion that is elongated in a cross-track direction at the ABS, and a second portion consisting of a plurality of pads each having a side adjoining the first portion along a side opposite the ABS. Pads may have a polygonal shape or a shape with curvature and are separated by portions of a dielectric layer. When a length of the pads in a down-track direction is substantially greater than a width in a cross-track direction and height in a vertical direction, then shape anisotropy in the shield is biased in a down-track direction and is perpendicular to the driving flux direction from the main pole tip thereby minimizing 180 degree rotations in magnetization and associated adjacent track erasure.

22 Claims, 10 Drawing Sheets

PMR WRITER WITH PATTERNED SHIELDS FOR ADJACENT TRACK ERASURE IMPROVEMENT

RELATED PATENT APPLICATIONS

This application is related to U.S. Pat. No. 8,035,930 and U.S. Pat. No. 8,498,079, both assigned to a common assignee and herein incorporated by reference in their entirety.

TECHNICAL FIELD

The present disclosure relates to a magnetic shield structure adjoining a main pole along an air bearing surface (ABS) in a perpendicular magnetic recording (PMR) write head, and in particular to shields that are patterned to bias the initial magnetization in a direction that is perpendicular to the driving flux direction from a nearest side of the main pole thereby minimizing 180 degree magnetization rotations related to stray field leakage and reducing adjacent track erasure (ATE).

BACKGROUND

In today's PMR technology, an all wrapped around (AWA) shield writer is widely used by the major hard disk drive (HDD) manufacturers. The function of a trailing shield in an AWA structure is to improve the magnetic field gradient along a down track direction that is a key requirement for high bits per inch (BPI). Meanwhile, side shields and a leading shield serve to define a narrower writer bubble that is important for realizing higher tracks per inch (TPI). In hard disk drives, ATE is one of the most critical issues to be addressed for optimizing the performance of PMR writers. Both micromagnetic modeling described by S. Song et al. in "Micromagnetic analysis of adjacent track erasure of wrapped-around shielded PMR writers", IEEE Trans. Magn., vol. 45, No. 10, pp. 3730-3732 (2009), and experimental data provided by Y. Tang et al. in "Characterization of adjacent track erasure in perpendicular recording by a stationary footprint technique", IEEE Trans. Magn., vol. 49, No. 2, pp. 744-750 (2013) indicate that one of the root causes for ATE is the stray field from side shields during the dynamic writing cycles. ATE was found to have a strong dependence on writing frequency. As a result, more severe ATE issues are expected as HDD technology moves toward ultra-high data rates in the near future.

Magnetic side shields in conventional PMR writers have an elongated shape along the cross-track direction at the ABS, and this design induces shape anisotropy in the cross-track direction. Accordingly, the magnetization of magnetic material in the side shields will also be along the cross-track direction due to shape anisotropy. During a HDD dynamic magnetic recording process, magnetic flux generated from the main pole tip of the PMR writer will drive the two side shields along the cross-track direction at a very high frequency (~1 GHz). Both of the modeling and experimental studies from the aforementioned references show that strong stray field leakage from side shields is closely coupled with the domain formation, especially the initial magnetization direction in the side shields at high frequency magnetic switching. Based on experimental results, 180 degree magnetization rotations occur when the driving magnetic flux is opposite to the initial magnetization along the cross-track direction. These rotations produce magnetic charge that in turn causes stray field leakage from the side shields. Therefore, an improved magnetic shield structure is required that controls domain formation (initial magnetization direction) in side shields and thereby avoids the 180 degree magnetization rotations to enable improved ATE.

SUMMARY

One objective of the present disclosure is to provide a shield structure in one or more of a trailing shield, leading shield, and side shields that induces shape anisotropy along a vertical or down-track direction that is orthogonal to a cross-track direction.

A second objective of the present disclosure is to provide a magnetic shield structure according to the first objective such that the shield structure has a shape from an ABS perspective that has no adverse effect on magnetic spacing control and no negative impact with respect to on-track performance.

According to the embodiments of the present disclosure, these objectives are achieved with a magnetic shield structure in a PMR writer having a main pole structure with a pole tip at the ABS. One or more of the two side shields, trailing shield, and leading shields surrounding the main pole tip is comprised of an elongated rectangular shaped portion at the ABS and a plurality of pads adjoining a side of the elongated portion that is opposite and parallel to the ABS. From a top (down-track) view, the pads have shapes such as rectangles, triangles, or semi-circles that are separated by spaces to form a pattern. Each of the pads has a width (w) in a cross-track direction, a length (t) in a down-track direction, and a height (h) in a vertical direction that is orthogonal to the ABS and towards a back end of the PMR writer. The shield structure may be entirely comprised of a soft magnetic material that has an isotropic or anisotropic (+Ku) energy constant such as NiFe, CoFe, or CoNiFe with a 10 kG, 16 kG, 19 kG, or 24 kG magnetic flux density. In one aspect, the pads may be made of a higher Ms magnetic material than in the elongated portions adjoining the ABS. In an alternative embodiment, the pad composition is modified to be a magnetic material with a negative crystalline anisotropy energy constant (−Ku) at room temperature. As a result, magnetization in the pads of the patterned shield structure comprised of an anisotropic (−Ku) magnetic material is aligned perpendicular to a cross-track direction and can only be induced in a cross-track direction with a strong magnetic field thereby reducing the tendency for the shield structure to undergo 180 degree magnetization rotations that cause adjacent track erasure in the magnetic medium during a dynamic write process.

The anisotropic (−Ku) magnetic material may be comprised of hcp-CoIr wherein the Ir content is 10 to 40 atomic %, and preferably between 17 and 22 atomic %, dhcp-CoFe, a'—Fe—C, or NiAs-type $Mn_{50}Sb_{50}$.

In a preferred embodiment, shape anisotropy in the one or more shield structures is induced either in a down-track direction or in the vertical direction. In one aspect, length "t" is substantially larger than "h" and "w" in the patterned shapes, and shape anisotropy is induced along a down-track direction. On the other hand, when "h" is substantially larger than "t" or "w", then shape anisotropy is induced in the vertical direction. The spacing (s) between adjacent pads may vary from a condition where s<w to one where s=w or s>w. The height and width of the elongated side shield portions are 0.15-0.5 microns, and 5-50 microns, respectively. Pad dimensions are preferably 0.3 to 0.7 microns for "w", 0.5 to 3 microns for "h", 0.7 to 3 microns for "t", and "s" should have a minimum size of 0.5 w.

In the exemplary embodiment, each side shield is separated from the nearest side of the main pole tip by a side gap made of a dielectric layer. An end of the elongated side shield portion that adjoins the side gap and faces the main pole tip may be sloped with respect to the down-track "vertical" direction. When the main pole tip has beveled sides such that a trailing (top) edge is longer in a cross-track direction than the leading (bottom) edge, the width of the side gap may be constant. As a result, an end of the elongated side shield portion is formed parallel to the nearest main pole tip side with a slope that is essentially equal to the bevel angle of the main pole tip.

When the shield structure is comprised entirely of the same magnetic material, then a conventional process sequence may be employed to form one or more of the leading shield, side shields, and trailing shield. In other words, an opening in a non-magnetic layer may be formed with the shape of the desired shield structure and then a plating process or sputter deposition may be used to fill the opening and simultaneously form the elongated shield portion and the plurality of pads. In an alternative embodiment where the pads have a different magnetic composition than in the elongated shield portion, a first patterning step and a first deposition step are used to deposit the pads, and then a second patterning step followed by a second deposition step are employed to deposit the elongated shield portion.

BRIEF DESCRIPTION OF THE DRAWINGS

FIG. 5b is an ABS view of the side shield structure in FIG. 5a.

FIGS. 11a-13 illustrate a sequence of steps during the fabrication of a patterned shield structure according to an embodiment of the present disclosure.

FIGS. 14a-18 illustrate a sequence of steps whereby a pad portion with a first composition is deposited prior to an elongated shield portion having a second composition according to another embodiment of the present disclosure.

DETAILED DESCRIPTION

The present disclosure is a shield structure in a PMR writer that is designed to minimize 180 degree magnetization rotations in one or more shield elements during a write process and thereby reduce flux leakage and associated ATE. Although the exemplary embodiments relate to an AWA PMR writer also known as a fully wrapped-around shield writer, or a wrapped-around shield writer where the leading shield is omitted and side shields are connected to a trailing shield, other shield configurations are also compatible with a patterned shield design of the present disclosure. Furthermore, the patterns formed in side shields as disclosed herein may also be incorporated in a leading shield and trailing shield. Thus, the present disclosure anticipates one or more of a leading shield, trailing shield, and side shields may have a patterned structure wherein a plurality of patterned features are formed on a side of the shield that is opposite the ABS. However, the exemplary embodiments depict only patterned side shields in order to simplify the drawings. The main pole structure may not be tapered, or may have one or both of a tapered trailing edge and a tapered leading edge. The drawings show an x-axis (cross-track direction), z-axis (down-track direction), and a y-axis that is orthogonal to the ABS in a vertical direction toward a back end of the PMR writer. Width in the context of shield structures disclosed herein refers to a distance in a cross-track direction, height is in a vertical direction, and length (thickness) is in a down-track direction. Shields may be made of a 10 kG, 16 kG, 19 kG, or 24 kG magnetic layer, for example, which refers to the saturation magnetization (Ms) or Bs of the magnetic layer.

Most single crystal magnetic materials have a magnetic energy that is anisotropic due to the crystalline structure. Normally, the anisotropy energy constant hereafter referred to as Ku is positive which means the magnetic energy is lowest with a magnetization direction along the c-axis. In the absence of an external field, magnetization is aligned with the c-axis which is defined as the easy axis, and the plane orthogonal to the c-axis is defined as the hard axis plane. When the crystalline anisotropy energy is negative (Ku<0) as described previously in related U.S. Pat. No. 8,498,079, the magnetic energy in the absence of a magnetic field is highest along the c-axis which represents the hard axis. Thus, a plane orthogonal to the c-axis is the easy axis plane. As a result, the magnetization of a hexagonal crystal magnetic material with a negative Ku value, hereafter referred to as an anisotropic (−Ku) magnetic material, can be rotated to the direction of the c-axis only with a large magnetic field. In an elongated shape that is typical of conventional side shields that have a (+Ku) energy constant, the c-axis is normally in the cross-track direction. In a conventional shield, the soft magnetic material has a very low crystalline anisotropic energy that is insignificant compared with the shape anisotropy energy. Thus, the elongated shape of a shield determines that the magnetization direction within a shield is along the same axis as the elongated direction.

Figure 1:
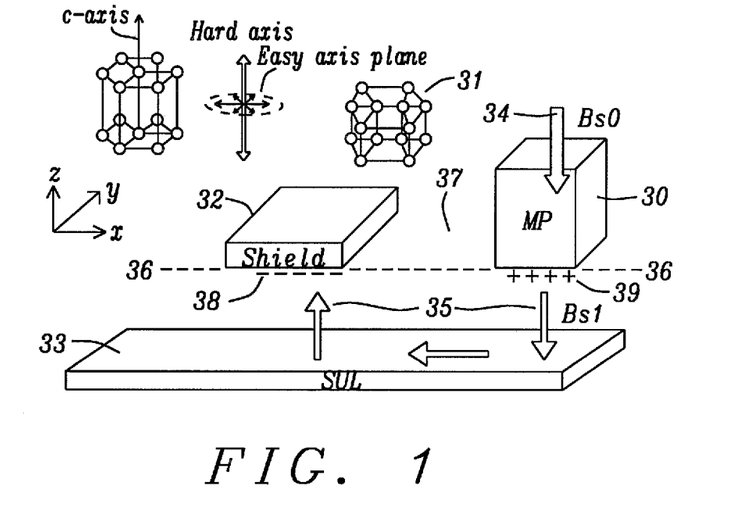
FIG. 1 is an oblique view of a PMR writer wherein a shield is made of an anisotropic (−Ku) magnetic material having a hard axis aligned in a direction toward the ABS to minimize ATE.

Referring to FIG. 1, a shield 32 that is made of an anisotropic (−Ku) magnetic material with a plurality of −Ku crystals 31 has a hard axis aligned in the z-axis direction (perpendicular to the ABS), and is shown with a bottom surface along an ABS 36-36. A main pole 30 is formed in an x-axis direction from the shield 32 and is separated therefrom by gap 37. Note the c-axis of each hexagon crystal 31 is pointing toward the magnetic medium 33 that has a soft underlayer (SUL) containing a plurality of magnetic bits (not shown). Coils (not shown) generate magnetic flux 34 having a Bs0 component within the main pole, and a Bs1 component that exits the main pole at the ABS and passes into the magnetic medium. Magnetic charges 38 at the ABS along the shield 21, and magnetic charges 39 at the ABS along the main pole are formed during a write process to facilitate the desired flow 35 of flux from the main pole 30 into the magnetic medium 33, and then returning into the shield 32. It should be understood that a patterned portion of a shield may be comprised of an anisotropic (−Ku) magnetic material according to embodiments of the present disclosure.

Figure 2:
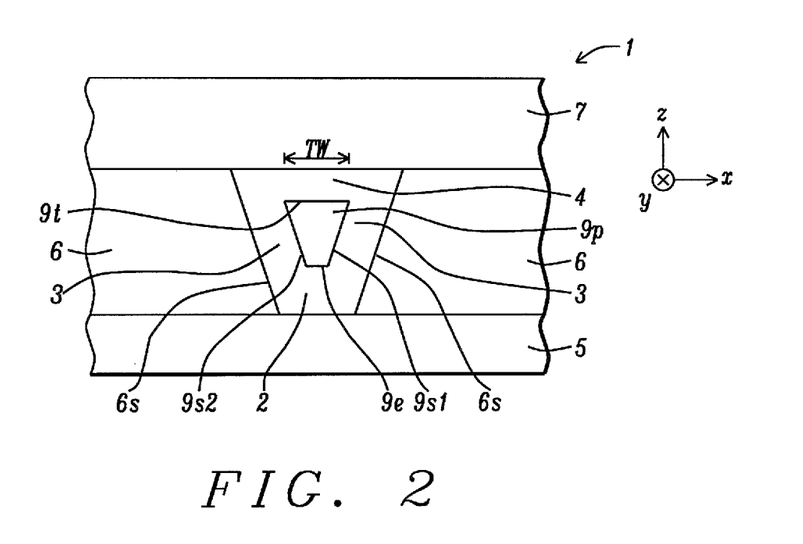
FIG. 2 is an ABS view of a fully all wrapped around (AWA) shield structure according to one embodiment of the present disclosure.

Referring to FIG. 2, a fully AWA shield structure formed around a main pole tip 9p is shown from an ABS view according to a process of record (POR) practiced by the inventors. The main pole tip has a leading edge 9e and a trailing edge 9t that are connected by sidewalls 9s1, 9s2 at the ABS. The leading edge is separated from a leading shield 5 by a gap layer 2, sidewalls 9s1 and 9s2 are separated from side shields 6 by a dielectric layer 3 that serves as a side gap, and the trailing edge is separated from trailing shield 7 by write gap 4. Track width TW is defined as the distance along the trailing edge in a cross-track direction. Gap layers are made of a non-magnetic material while shields 5-7 are generally comprised of a magnetic material such as NiFe, CoFe, or CoNiFe.

Figure 3:
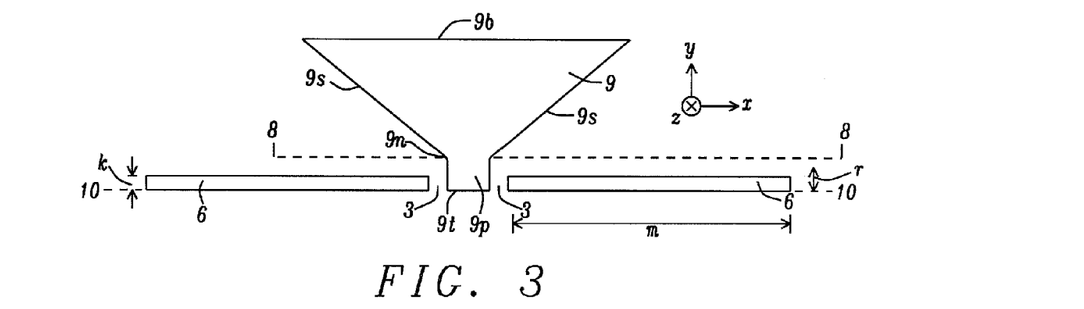
FIG. 3 is a top-down view of a conventional side shield structure showing an elongated along the ABS on each side of a main pole tip.

A top down-view of the side shield structure in FIG. 2 with trailing shield removed is shown in FIG. 3. Side shields are shown on either side of main pole tip 9p that has an end 9t. Each side shield has an elongated shape wherein the width m along the cross-track direction is substantially greater than the height k in a vertical direction from the ABS 10-10. Plane 8-8 is parallel to the ABS and includes an end of main pole tip 9p that adjoins the yoke portion 9 of the main pole structure at neck height position 9n. The yoke has sides 9s that flare away from the vertical direction with increasing distance from the ABS and connect to a back side 9b. In FIG. 3, k is less than the distance r between the ABS and plane 8-8. However, there are known side shield structures where r>k. For example, in U.S. Pat. No. 8,035,930, we disclosed a side shield structure wherein each side shield has a first end section facing the main pole tip and a second section with a tapered side facing a side of the yoke.

Figure 4A:
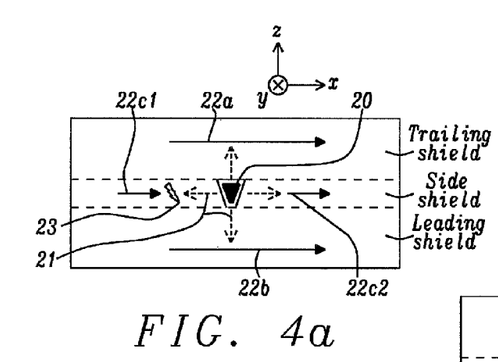
FIG. 4a is an ABS view of a conventional shield structure wherein initial magnetization in one side shield is opposite to the driving flux direction and causes a 180 degree rotation in magnetization that results in flux leakage and ATE.

Referring to FIG. 4a, an ABS view illustrates a main pole tip 20 and the driving flux 21 that emanates therefrom in down-track and cross-track directions. Initial magnetization directions 22a and 22b for the trailing shield and leading shield, respectively, are perpendicular to the nearest driving flux direction. Initial magnetization direction 22c2 in one side shield is aligned with the nearest driving flux field, but initial magnetization 22c1 in the other side shield is opposed to the driving flux 21. Region 23 where driving flux opposes initial magnetization in the side shield readily undergoes a 180 degree magnetization rotation whereby the magnetization 22c1 flips (not shown) to the opposite cross-track direction. This 180 degree rotation is associated with considerable flux leakage that generates undesirable ATE.

Figure 4B:
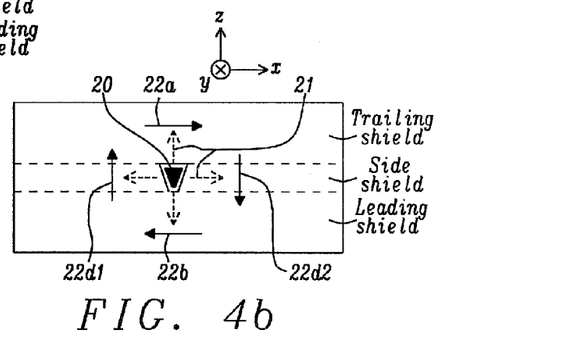
FIG. 4b is an ABS view of a shield structure of the present disclosure wherein side shields have an initial magnetization biased in a down-track direction that avoids 180 degree rotations in magnetization.

Referring to FIG. 4b, an ABS view is shown of a PMR writer wherein side shields are comprised of a patterned structure as described in embodiments of the present disclosure. Initial magnetization directions 22a, 22b remain perpendicular to the nearest flux field 21. Furthermore, we have discovered that initial magnetizations 22d1, 22d2 in the patterned side shields are aligned along the down-track axis and are perpendicular to the driving flux field as a result of down-track biasing. In an alternative design (not shown), initial magnetization in the side shields may be biased in a vertical direction (in and out of the plane of the drawing) and achieve a direction that is perpendicular to the driving flux. In either case, biasing of initial magnetization in a shield structure to a direction that is perpendicular to the driving flux is highly effective in substantially reducing the frequency of 180 degree magnetization rotations and dramatically minimizing flux leakage and ATE.

Figure 5A:
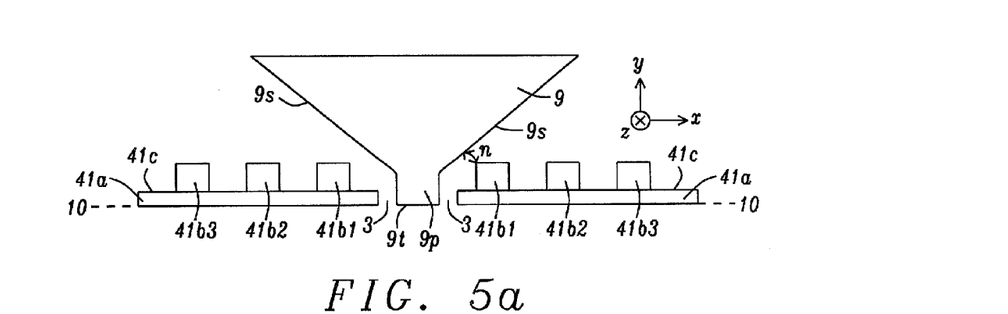
FIG. 5a is a top-down view of a PMR writer structure of the present disclosure wherein side shields are patterned with a plurality of pads on both sides of the main pole layer.

According to one embodiment of the present disclosure depicted in FIG. 5a, magnetization in side shields is biased in a down-track or vertical direction by incorporating a plurality of pads 41b1-41b3 along a side 41c of each elongated side shield portion 41a that faces away from the ABS. In one aspect, the pads are comprised of the same magnetic material as in the elongated side shield portions 41a. Alternatively, the pads may be made of a higher Ms material than in the elongated shield portion. For example, pads may be a 19 kG or 24 kG magnetic material while elongated portions are a 16 kG magnetic material. In yet another embodiment, the pads may be made of anisotropic (−Ku) magnetic material while the elongated portions are one of NiFe, CoNiFe, or CoFe. As shown in FIG. 5a, the pads may have a rectangular shape and are separated by spaces filled with a non-magnetic material that may have the same composition as that of gap layer 3. Although three pads are pictured, there may be a minimum of 2 pads in each side shield. A maximum number of pads is determined by the width of each side shield, the desired shape of the pads, and the desired spacing between adjacent pads. There is a minimum distance n of at least 0.8 micron between the yoke 9 and first pad 41b1 and this spacing requirement usually means the first pad must be recessed from an end of shield portion 41a that is adjacent to main pole tip 9p.

Figure 5B:
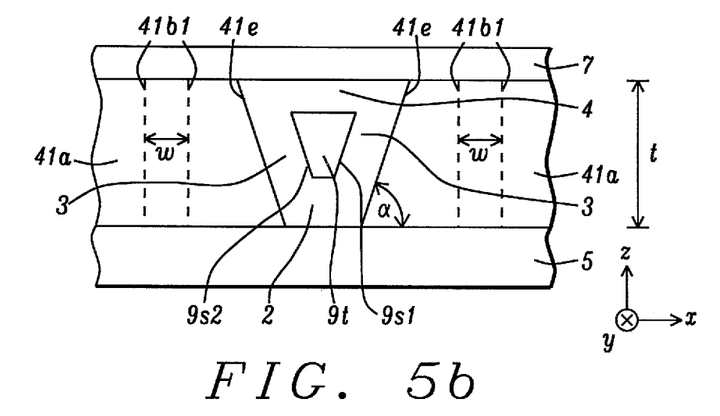

From an ABS view in FIG. 5b, the down-track thickness (length t) of each pad as indicated by pad 41b1 (located behind the plane of the drawing) may be equal to the thickness t of the elongated side shield section 41a. For ease of fabrication, both pads and elongated portion have the same length t, especially when the same magnetic material is used in both shield elements 41a, 41b1. In an embodiment where the pads have a different magnetic flux density than in the elongated portion, then the length of a pad may be equal to or less than the length of the elongated portion. Furthermore, an end 41e of each elongated side shield portion may be formed parallel to the nearest side 9s1, 9s2, respectively of the main pole tip 9p and has a bevel angle α from 0 to 20 degrees with respect to the vertical direction.

Figure 6A:
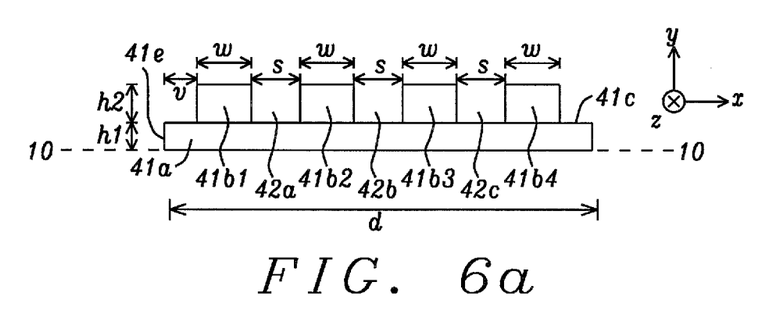
FIGS. 6a-6d are top-down views showing various embodiments of a patterned side shield structure of the present disclosure wherein a plurality of pads are formed along a side of an elongated shield section that faces away from the ABS.

In one embodiment of the present disclosure depicted in the top-down view in FIG. 6a, one of the side shields is shown with an elongated side shield portion 41a having a width d at the ABS 10-10, an end 41e facing the main pole tip (not shown), and a side 41c that is opposite the ABS and located a distance (height h1) therefrom. The other side shield (not shown) has a mirror image configuration about a plane orthogonal to the ABS and that is aligned in a y-axis direction. The end 41e typically has a minimum separation from the main pole tip 9p of around 30 to 40 nm. A key feature is a plurality of pads 41b1-41b4 that contact side 41c wherein a first pad 41b1 is recessed a distance v of at least 0.5 micron along the cross-track direction from end 41e. In a patterned leading shield or trailing shield (not shown), there is no need to recess the pads from either end of the elongated portion. Four pads are used as an example but are not necessarily the maximum or optimum number of pads in a patterned side shield. Adjacent pads are separated by a space that is one of 42a-42c. In one aspect, each of the pads has a rectangular shape and extends a distance (height h2) in a vertical direction from side 41c. Moreover, each pad 41b1-41b4 may have a width w and is separated from an adjacent pad by a space having a cross-track width s. In the exemplary embodiment, w=s. However, the present disclosure also anticipates that s may be less than or greater than w although s should be at least 0.5 w. In another aspect, the height of the pads 41b1-41b4 may vary and still provide the full benefit of a patterned side shield structure. For example, pad 41b1 may have a smaller height than h2 in order to increase the gap distance n from yoke side 9s in FIG. 5a. Generally, h2 is greater than the height of the elongated portion (h1 in FIG. 6a) to maximize the effect of down-track or vertical magnetic biasing.

As indicated previously, the pads 41b1-41b4 and elongated side shield portion 41a may be comprised of a magnetic material such as NiFe, CoFe, or CoNiFe. Optionally, elongated side shield portions may be made of a 16 kG magnetic material while pads are comprised of a high Ms (19 kG or 24 kG) material. In a patterned trailing shield or patterned leading shield, pads may be a 24 kG material while elongated portions are a 19 kG material. Preferably, d is from 5 to 50 microns, and h1 is 0.15 to 0.5 microns. In the patterned portion of each side shield, preferably w is 0.3 to 0.7 microns, h2 is 0.5 to 3 microns, and length t in a down-track direction is 0.7 to 3 microns. The aspect ratio (length/width or height/width) in the pads will determine the strength of the induced shape anisotropy in a down-track or vertical direction, respectively. Thus, when length t is substantially greater than h2 and w, shape anisotropy in the side shields (or trailing shield or leading shield) is biased in a down-track direction. However, when h2 is substantially larger than t or w, then shape anisotropy in the shield structure is biased in the vertical direction. In either case, shape anisotropy is no longer in the cross-track direction and thereby minimizes the frequency of 180 degree rotations during dynamic writing cycles.

The present disclosure also encompasses a side shield structure wherein the elongated portion 41a is made of a soft magnetic material but the magnetic material in the pads 41b1-41b4 is an anisotropic (-Ku) magnetic material. The anisotropic (-Ku) magnetic material may be one of hcp-CoIr wherein the Ir content is 10 to 40 atomic %, and preferably between 17 and 22 atomic %, dhcp-CoFe, a'—Fe—C, or NiAs-type $Mn_{50}Sb_{50}$. In this embodiment, the side shields have a crystalline anisotropy such that the hard axis is along the cross-track direction due to the property of the (-Ku) crystals in the pads. A method of fabricating a side shield structure that includes two portions each having a different magnetic material composition will be described in a later section.

Figure 6B:
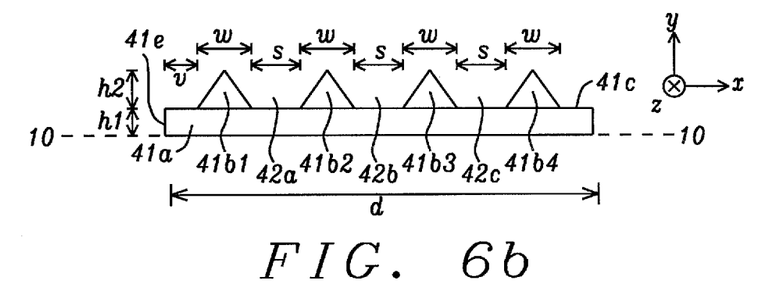

In a second embodiment shown in FIG. 6b, the side shield structure in the first embodiment is modified whereby the rectangular pad shapes are replaced by triangular shapes each having a first side that contacts side 41c and the remaining two sides converging to a point that is a height h2 from elongated side shield portion 41a. All three sides may be equivalent in size equal to width w of the first side, or the remaining two sides may have a size that is greater than or less than w. In an alternative embodiment, polygons other than rectangles or triangles may be used as pad shapes.

Figure 6C:
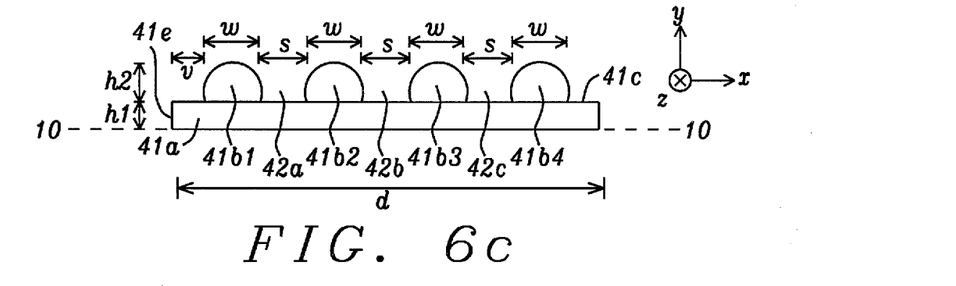

In a third embodiment depicted in FIG. 6c, the side shield structure in the first embodiment is modified so that the rectangular pads are replaced by pads with curved shapes each having a substantial amount of surface area with curvature. Half-spheres or other shapes with curvature may be employed. Preferably, each curved shape comprises a sufficiently long flat portion at the curved shape base at side 41c in order to form a secure attachment to the elongated side 41a and to enable the side shield structure to be reliably reproduced in a manufacturing process.

Figure 6D:
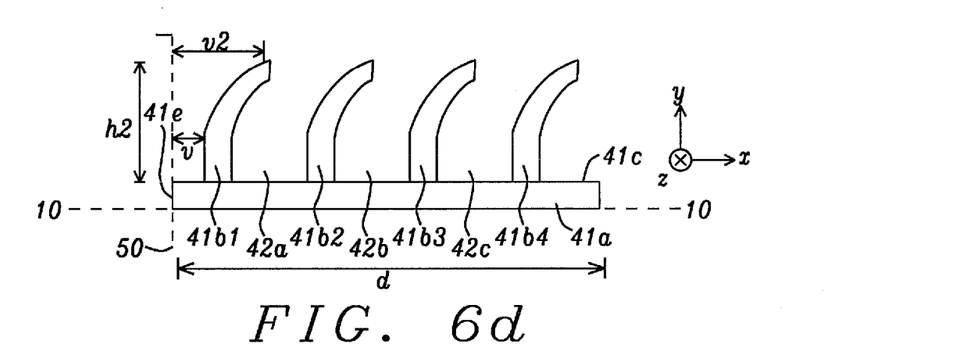

In a fourth embodiment represented by FIG. 6d, each pad may have a shape that is not symmetrical about a plane aligned in a vertical direction. For example, pads 41b1-41b4 may have a wave shape where an end of the wave shape at a distance h2 from side 41c is tilted away from end 41e and the yoke (not shown). Thus, the base of the wave shape 41b1 at surface 41c is recessed a distance v from end 41e while an end of the wave shape opposite the base is formed a distance v2 substantially greater than v from a plane 50-50 extending vertically from end 41e. In this case, h2 is preferably substantially greater than w in order to maximize shape anisotropy in the vertical direction. Furthermore, the width of a wave shape may vary from w at an end adjoining side 41c to a size unequal to w near the opposite end at a distance h2 from side 41c.

Figure 7A:
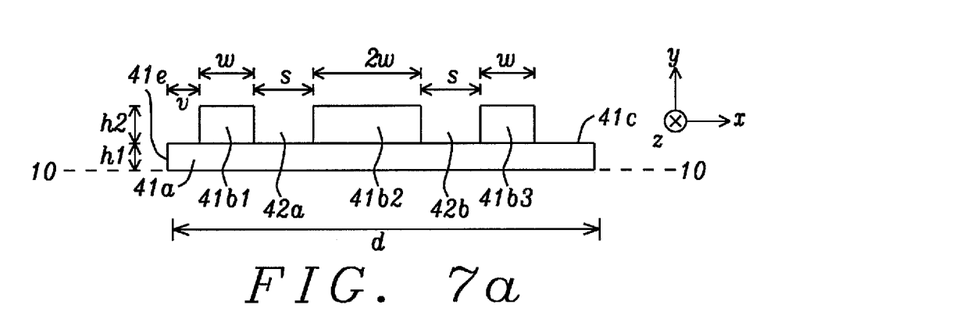
FIG. 7a-7b are modifications of the side shield structure in FIG. 6a wherein the pads have variable widths, or the spaces between pads have variable widths.

According to a fifth embodiment depicted in FIG. 7a, the pad shapes in a patterned side shield may have unequal widths. Pad 41b1 may have a width w that is less than width 2w of pad 41b2. A width ratio of 2:1 or 1:2 for adjacent pads 41b1, 41b2 or 41b2, 41b3, respectively, is provided as an example. However, the width of pad 41b2 may be other sizes that are greater than w. The present disclosure also anticipates that pad 41b2 may have a smaller width than w. Optionally, one or more widths for other pads in a patterned side shield structure may be different from width w for pad 41b1. In principle, any pattern with a plurality of "i" pads 41b1 up to 41bi (not shown) may be selected for a side shield of the present disclosure as long as the pattern is able to be reproducibly fabricated in a manufacturing scheme.

Figure 7B:
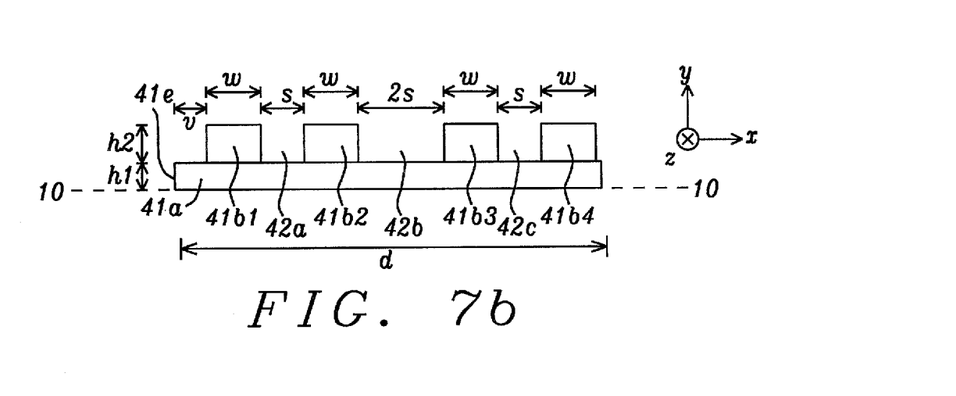

A sixth embodiment is shown in FIG. 7b and comprises a modification of the side shield structure in FIG. 6a wherein spaces 42a-42c have different widths. For example, space 42a may have a width s while space 42b has a width 2s. In alternative embodiments, one or more of the spaces 42b, 42c may have a width that is different from width s for space 42a. However, all spaces should have a magnitude at least one half of the width of adjacent pads.

Figure 8A:
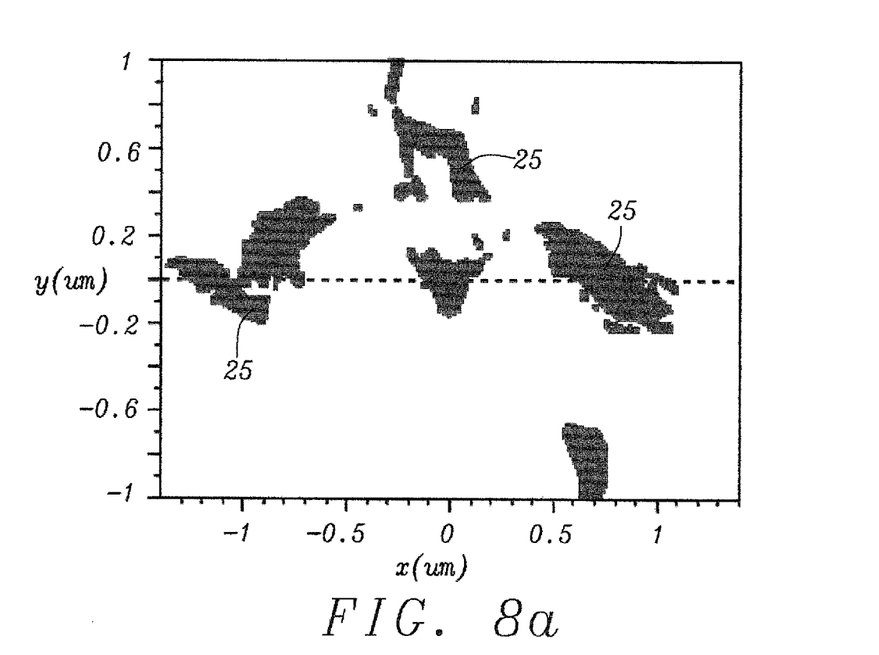
FIG. 8a is a plot showing 2D ATE mapping of a PMR writer with conventional side shields.
Figure 8B:
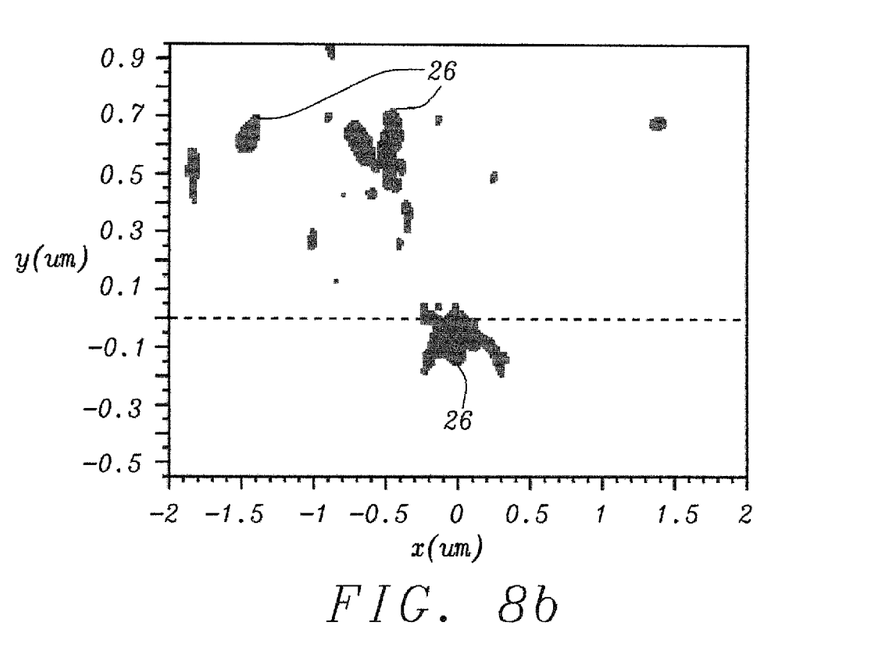
FIG. 8b is a similar plot for a PMR writer with patterned side shields formed according to an embodiment of the present disclosure.

Referring to FIG. 8a, a 2D ATE map of a PMR writer with conventional side shields as shown in FIG. 3 is provided. Regions 25 represent (x, y) coordinates where the magnetic field intensity is greater than 1500 Oe and this stray field is considered to be sufficiently strong to cause undesirable ATE. A 2D ATE map of a PMR writer with a patterned side shield design according to an embodiment of the present disclosure is shown in FIG. 8b and indicates stray field regions 26 with field intensity above 1500 Oe are considerably reduced in size compared with stray field regions 25 in FIG. 8a.

Figure 9A:
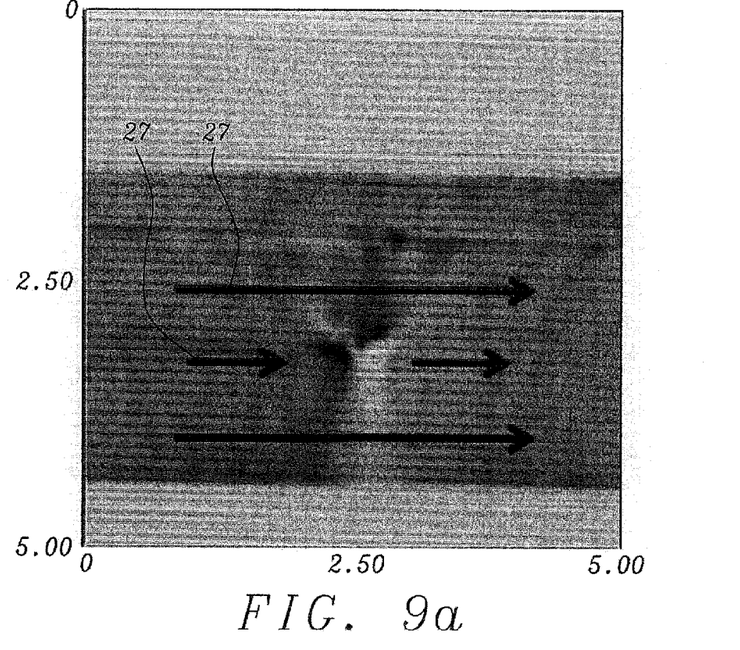
FIG. 9a and FIG. 9b show magnetic force microscopy (MFM) measurements from PMR writers with conventional shields and patterned shields, respectively.
Figure 9B:
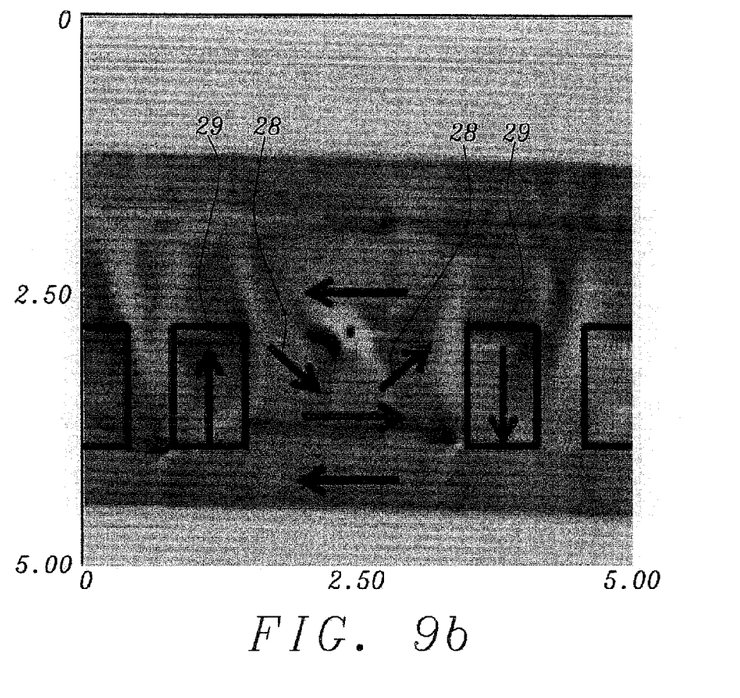

Referring to FIG. 9a, a magnetic force microscopy (MFM) measurement of the ABS of a PMR writer with a conventional AWA shield structure including a side shield design from FIG. 3 is provided. Arrows 27 are placed on the MFM results to indicate the magnetization direction in the shield structure and are in agreement with initial magnetization directions 22a, 22b, 22c1, and 22c2 in FIG. 4a. FIG. 9b shows MFM measurements of the ABS of a PMR writer with a patterned side shield design as disclosed herein. Arrows 28 indicate the magnetization direction in the shield structure and support a conclusion that initial magnetization in the side shields is tilted toward a down-track position from a horizontal (cross-track) direction. Rectangles 29 show the approximate positions of patterned pads located behind the elongated side shield portions at the ABS, and the arrows within the rectangles indicate the down-track biasing effect of the pads.

Figure 10A:
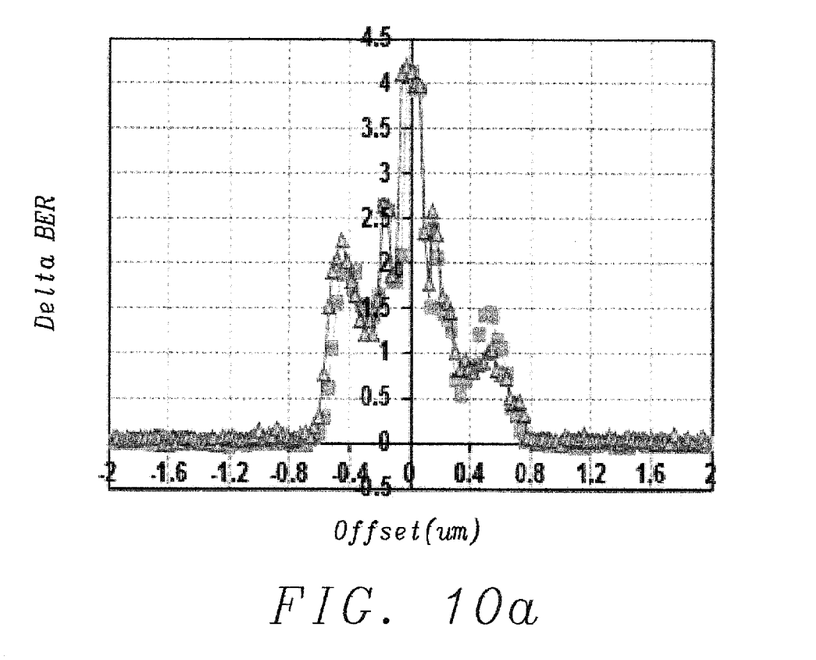
FIG. 10a depicts ATE spinstand measurements for a PMR writer with conventional shields.
Figure 10B:
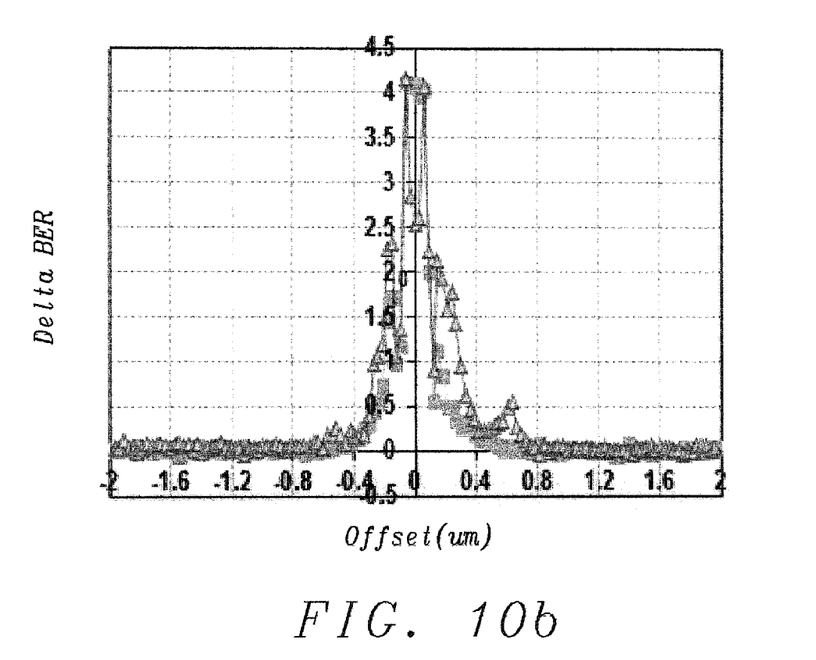
FIG. 10b shows an ATE profile for a PMR writer with patterned shields formed according to an embodiment of the present disclosure.

In FIG. 10a, an ATE profile is illustrated for a PMR writer with conventional shields where h is ~0.2 micron and w is ~40 microns, and in FIG. 10b, an ATE profile is shown for a PMR writer with patterned side shields according to an embodiment of the present disclosure where t is from 0.8 to 1 micron, w ~0.5 micron, h2 ~0.5 micron, s 0.5 micron, and h1 ~0.2 micron. In both cases, track pitch is 70 nm. FIG. 10b shows a substantial improvement in profile which means less ATE with the patterned side shield design. Note that the MFM results in FIG. 9b and ATE measurements in FIG. 10b are generated from the same head design.

Figure 11A:
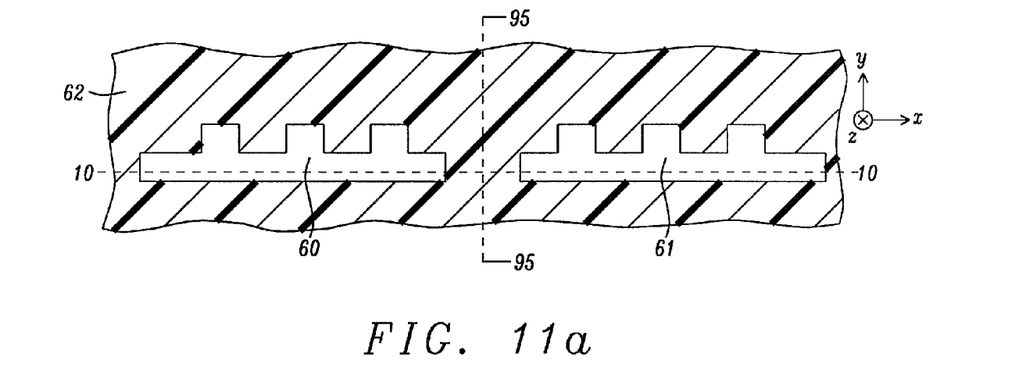

The present disclosure also encompasses a method of forming a shield design in a magnetic recording head according to the embodiments described herein. As shown in one sequence of steps in FIGS. 11a-13, a method is provided for forming a patterned side shield structure wherein both of the pads and elongated shield portion are made of the same magnetic material. FIG. 11a depicts an intermediate structure during the fabrication process wherein a dielectric layer and first photoresist layer 62 are sequentially deposited on a substrate (not shown). Openings 60, 61 corresponding to the desired shape of side shields are formed in the first photoresist layer on either side of a plane 95-95 that will eventually bisect the main pole layer to be deposited in a subsequent step. A reactive ion etch (RIE) may be employed to transfer the openings 60, 61 through a portion of an underlying dielectric (gap) layer 3. Although rectangular shapes are used for the pad portions in the openings, it should be understood that other polygonal or curved shapes previously described may be substituted for the rectangular shapes. Plane 10-10 indicates the eventual position of the ABS after all layers in the magnetic recording head are formed and a lapping process is performed.

Figure 11B:
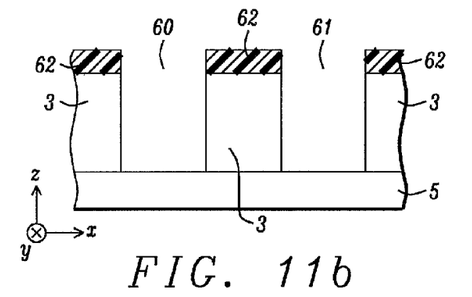

Referring to FIG. 11b, a cross-sectional view of the structure in FIG. 11a is shown along the plane 10-10 where the openings 60, 61 extend through photoresist layer 62 and through dielectric layer 3 and stop on a top surface of leading shield 5 that serves as the substrate in this embodiment.

Figure 12:
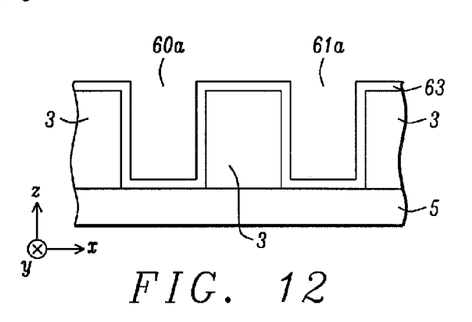

During a following step in FIG. 12, the first photoresist layer is removed by a conventional process and then a conformal seed layer 63 is laid down on the sidewalls and bottom surface of the openings by atomic layer deposition (ALD), for example. The seed layer may be Ru, or other seed layer materials known in the art may be used. As a result, openings 60a, 61a are now ready for a plating process.

Figure 13:
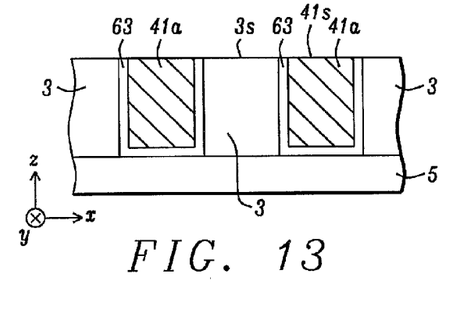

Referring to FIG. 13, magnetic material is preferably deposited by an electroplating process to fill the openings 60a, 61a (FIG. 12). Thereafter, a chemical mechanical polish (CMP) process is used to form a planar top surface comprising top surface 3s of dielectric layer 3 and top surface 41s of the elongated shield portions 41a. It should be understood that top surface 41s also includes a top surface of the pads (not shown). Thus, the structure in FIG. 13 corresponds to the design illustrated in FIG. 5a without the main pole layer.

Figure 14A:
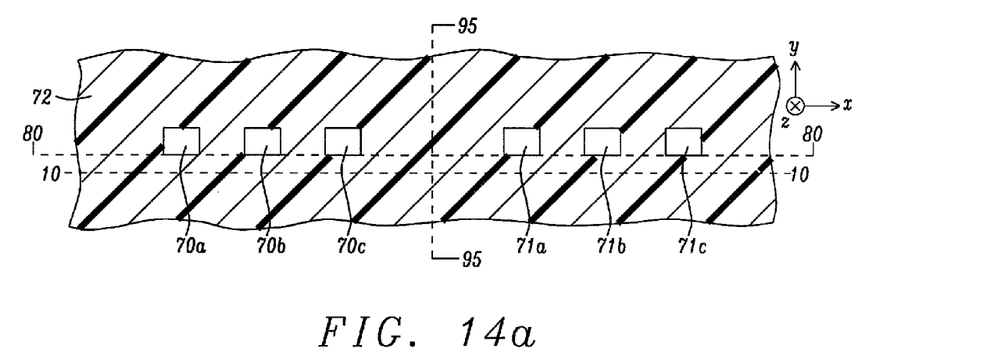

According to another embodiment of the present disclosure, another fabrication process involves a sequence of steps shown in FIGS. 14a-18. In FIG. 14a, a photoresist layer 72 is patterned on a dielectric layer (not shown) to form a plurality of openings corresponding to the desired pad shapes in two side shields. In one aspect, where both side shields have three pads, for example, a first set of openings 70a-70c is formed on one side of vertical plane 95-95 and a second set of openings 71a-71c is formed on an opposite side of the vertical plane. In addition to the eventual ABS plane 10-10, a second plane 80-80 is shown that is parallel to the ABS and intersects each of the first set and second set of openings along a flat side that is closest to the eventual ABS plane.

Figure 14B:
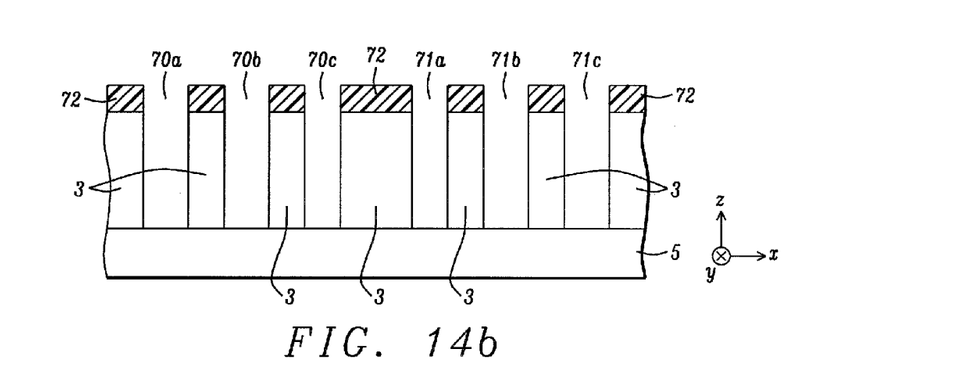

Referring to FIG. 14b, a cross-sectional view is shown along the plane 80-80 after a RIE process is employed to transfer the openings through an underlying dielectric layer 3. In the exemplary embodiment, each of the openings 70a-70c and 71a-71c extends through the photoresist layer 72 and the dielectric layer 3 and stops on the leading shield 5. In an alternative embodiment where a leading shield is not used as the substrate, the openings may stop on an etch stop layer (not shown) that is preferably made of a metal or another dielectric layer with a higher RIE resistance than the material in dielectric layer 3.

Figure 15:
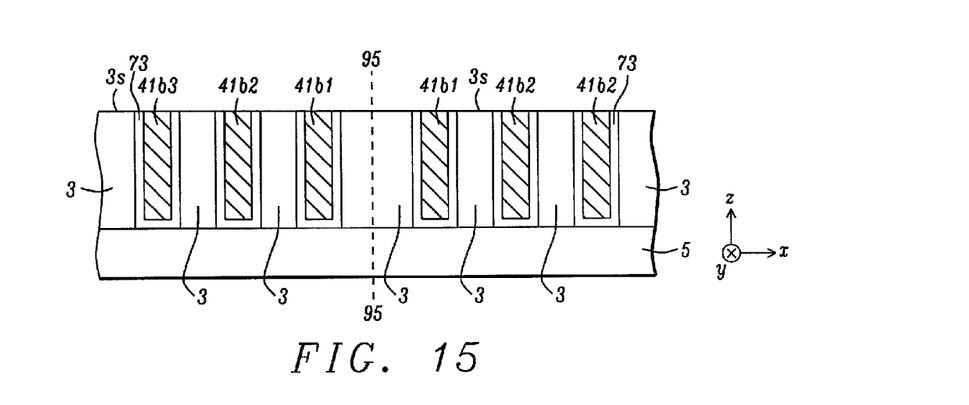

Referring to FIG. 15, photoresist layer 72 is removed and a seed layer 73 is conformally deposited on the sidewalls and bottom surfaces of openings 70a-70c and 71a-71c. Then, the desired high Ms or anisotropic (−Ku) material is electroplated in the openings to form the pads 41b1-41b3 on each side of the center plane 95-95. A CMP process may be used to form a planar top surface comprising the top surfaces of each pad and top surface 3s of the dielectric layer.

In the following step depicted in FIG. 16, a second photoresist layer 82 is patterned on the intermediate structure in FIG. 15. Two openings 90, 91 with an elongated shape in a cross-track direction are formed on either side of the center plane. It is important that a long side 90c of opening 90 and a long side 91c of opening 91 are formed along plane 80-80 and adjoin the ends of pads 41b1-41b3 that face plane 10-10. In addition, a second long side 90d is formed on an opposite side of plane 10-10 with respect to long side 90c, and a second long side 91d is formed on an opposite side of plane 10-10 with respect to long side 91c. Thus, plane 10-10 intersects the two ends of opening 90 that connect side 90c to side 90d and intersects the two ends of opening 91 that connect side 91c to side 91d.

Figure 16:
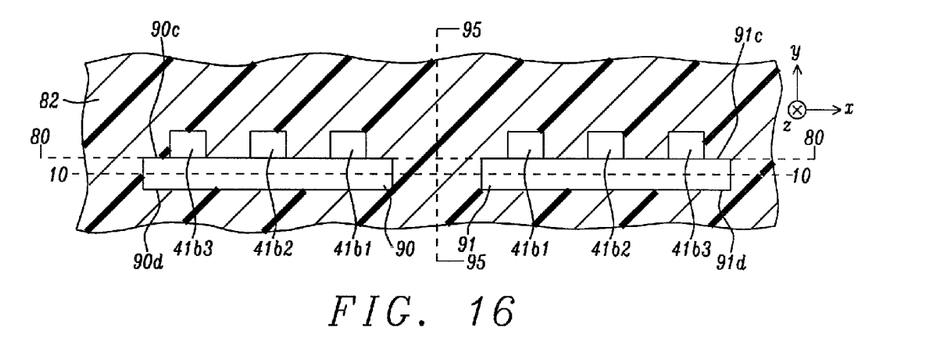
Figure 17:
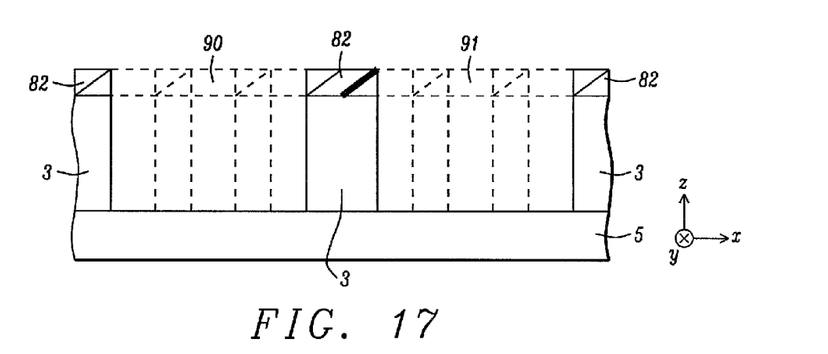

FIG. 17 illustrates a cross-sectional view along plane 10-10 of the intermediate structure in FIG. 16. Dashed lines behind openings 90, 91 indicate the positions of pads 41b1-41b3 and overlying photoresist layer 82 that are recessed behind plane 10-10.

Figure 18:
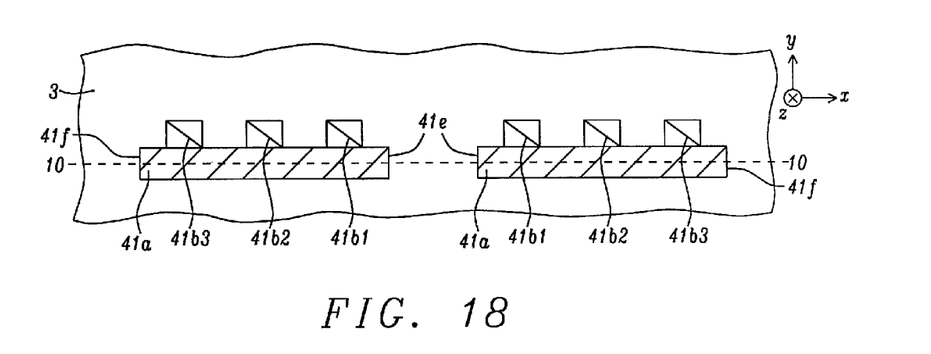

FIG. 18 depicts a top-down view after the second photoresist layer is removed and a magnetic material is deposited in the elongated openings to form elongated side shield portions 41a. Preferably a CMP process is performed to form a smooth top surface of layer 3 that becomes coplanar with side shield portions 41a and pads 41b1-41b3. Thereafter, the remainder of the recording head including deposition of a main pole layer and a trailing shield layer may be accomplished with conventional processing techniques. A lapping process along plane 10-10 that intersects the ends 41e, 41f of the elongated portions 41a and establishes the ABS position is performed after all of the layers in the recording head are formed. Therefore, any part of elongated side shield portions 41a below plane 10-10 will be removed during the lapping process.

According to one embodiment depicted in FIGS. 11a-13, an all-wrap-around shield structure with patterned pads in one or more of the side shields, leading shield, and trailing shield may be fabricated without any additional process steps while significantly improving ATE performance compared with prior art shield designs. In another embodiment found in FIGS. 14a-18, one extra patterning step and deposition step are required to form a shield structure with lower ATE wherein the pads and elongated shield portions are made of different magnetic materials. The shield design offers flexibility in biasing the shape anisotropy in either a down-track or vertical direction that is perpendicular to a cross-track direction. Moreover, pad shapes may be modified to maximize shape anisotropy along a specified direction while maintaining adequate spacing from the main pole layer.

While this disclosure has been particularly shown and described with reference to, the preferred embodiments thereof, it will be understood by those skilled in the art that various changes in form and details may be made without departing from the spirit and scope of this disclosure.

We claim:

1. A perpendicular magnetic recording (PMR) writer, comprising:
   (a) a main pole layer comprised of a main pole tip with one end having a leading edge and trailing edge at an air bearing surface (ABS), a second end that adjoins a yoke portion at a neck height distance from the ABS, and two sides that are perpendicular to the ABS and formed between the first and second ends;
   (b) a gap layer adjacent to and surrounding the main pole tip wherein the gap layer includes a write gap along a trailing side and the trailing edge, a lead gap along a leading side and the leading edge, and a side gap along each of the two sides of the main pole tip; and
   (c) a fully all wrapped around (AWA) shield structure comprising a trailing shield formed on the write gap, a leading shield that adjoins the leading gap, and two side shields with one side shield on each side of the main pole tip and adjoining a side gap, and wherein at least the two side shields have a patterned structure comprising:
      (1) an elongated portion made of a magnetic material and having a first length in a down-track direction, a first side at the ABS, a first end facing a side of the main pole tip, and a second side opposite and parallel to the first side, the first and second sides have a first width in a cross-track direction, the second side is a first distance (first height) from the ABS in a vertical direction that is perpendicular to the ABS; and
      (2) a plurality of patterned magnetic features adjoining the second side of the elongated portion, each of the patterned magnetic features is separated from an adjacent patterned magnetic feature by a space and has a second width in a cross-track direction, a second height in a vertical direction, and a second length in a down-track direction such that the second length is substantially greater than the second height and second width to generate a shape anisotropy bias in the down-track direction, or the second height is substantially greater than the second length and second width to generate a shape anisotropy bias in the vertical direction.

2. The PMR writer of claim 1 wherein the elongated portion and the plurality of patterned magnetic features in each side shield are made of the same magnetic material that is one of NiFe, CoFe, or CoNiFe.

3. The PMR writer of claim 2 wherein the plurality of patterned magnetic features in each side shield is made of a magnetic material with a higher Ms value than the magnetic material in the elongated portion.

4. The PMR writer of claim 1 wherein the plurality of patterned magnetic features in each side shield is made of an anisotropic (−Ku) material that is one of hcp-CoIr wherein the Ir content is between about 10 and 40 atomic %, dhcp-CoFe, a'—Fe—C, or NiAs-type $Mn_{50}Sb_{50}$.

5. The PMR writer of claim 1 further comprised of a plurality of patterned magnetic features in one or both of the leading shield and trailing shield, the patterned magnetic features are formed on a side of the leading shield or trailing shield that is opposite to a side at the ABS.

6. The PMR writer of claim 1 wherein the first height is about 0.15 to 0.5 microns, the second height is about 0.5 to 3 microns, the second length is about 0.7 to 3 microns, and the second width is about 0.3 to 0.7 microns.

7. The PMR writer of claim 1 wherein a first in the plurality of patterned magnetic features is recessed from the first end by a distance that is at least 0.5 microns.

8. The PMR writer of claim 7 wherein the first in the plurality of patterned magnetic features is separated from a side of the yoke portion by a distance of at least 0.8 microns.

9. The PMR writer of claim 1 wherein each space has a width that is at least half the second width.

10. The PMR writer of claim 1 wherein initial magnetization in the side shields is substantially in a down-track direction while initial magnetization in the trailing shield and leading shield is in a cross-track direction such that initial magnetization in each of the shields surrounding the main pole tip is perpendicular to a driving flux direction from a nearest side of the main pole tip.

11. A perpendicular magnetic recording (PMR) writer, comprising:
    (a) a main pole layer comprised of a main pole tip with one end having a leading edge and trailing edge at an air bearing surface (ABS), a second end that adjoins a yoke portion at a neck height distance from the ABS, and two sides that are perpendicular to the ABS and formed between the first and second ends;
    (b) a gap layer adjacent to and surrounding the main pole tip wherein the gap layer includes a write gap along a trailing side and the trailing edge, a lead gap along a leading side and the leading edge, and a side gap along each of the two sides of the main pole tip; and
    (c) an all wrapped around shield structure comprising a trailing shield formed on the write gap, and two side shields with one side shield on each side of the main pole tip and adjoining a side gap, and wherein at least the two side shields have a patterned structure comprising:
       (1) an elongated portion made of a magnetic material and having a first length in a down-track direction, a first side at the ABS, a first end facing a side of the main pole tip, and a second side opposite and parallel to the first side, the first and second sides have a first width in a cross-track direction, the second side is a first distance (first height) from the ABS in a vertical direction that is perpendicular to the ABS; and
       (2) a plurality of patterned magnetic features adjoining the second side of the elongated portion, each of the patterned magnetic features is separated from an adjacent patterned magnetic feature by a space such that the side shield structure has a shape anisotropy bias that is substantially in the down-track direction, or a shape anisotropy bias that is substantially in the vertical direction.

12. The PMR writer of claim 11 wherein the elongated portion and the plurality of patterned magnetic features in each side shield are made of the same magnetic material that is one of NiFe, CoFe, or CoNiFe.

13. The PMR writer of claim 12 wherein the plurality of patterned magnetic features in each side shield is made of a magnetic material with a higher Ms value than the magnetic material in the elongated portion.

14. The PMR writer of claim 11 wherein the plurality of patterned magnetic features in each side shield is made of an anisotropic (−Ku) material that is one of hcp-CoIr wherein the Ir content is between about 10 and 40 atomic %, dhcp-CoFe, a'—Fe—C, or NiAs-type $Mn_{50}Sb_{50}$.

15. The PMR writer of claim 11 further comprised of a plurality of patterned magnetic features in the trailing shield, the patterned magnetic features are formed on a side of the trailing shield that is opposite a trailing shield side at the ABS.

16. The PMR writer of claim 11 wherein each of the plurality of patterned magnetic features has a second height in a vertical direction, a second length in a down-track direction, and a second width in a cross-track direction.

17. The PMR writer of claim 16 wherein one or more of the plurality of patterned magnetic features has a second height or second width that is different from a second height or second width of a first patterned magnetic feature proximate to the first end.

18. The PMR writer of claim 16 wherein the first height is about 0.15 to 0.5 microns, the second height is about 0.5 to 3 microns, the second length is about 0.7 to 3 microns, and the second width is about 0.3 to 0.7 microns.

19. The PMR writer of claim 11 wherein a first in the plurality of patterned magnetic features is recessed from the first end by a distance that is at least 0.5 microns.

20. The PMR writer of claim 19 wherein the first in the plurality of patterned magnetic features is separated from a side of the yoke portion by a distance of at least 0.8 microns.

21. The PMR writer of claim 19 wherein each patterned side shield has a plurality of spaces and one or more spaces has a different width in a cross-track direction than a first space formed adjacent to the first in the plurality of patterned magnetic features.

22. The PMR writer of claim 11 wherein initial magnetization in the side shields is substantially in a down-track direction that is perpendicular to a driving flux direction from a nearest side of the main pole tip.

* * * * *